United States Patent
Iino et al.

[19]

[11] Patent Number: 6,099,262
[45] Date of Patent: Aug. 8, 2000

[54] AXIAL PISTON MACHINE

[75] Inventors: Takashi Iino; Mikihiro Takano, both of Wako, Japan

[73] Assignee: Honda Giken Kogyo Kabushiki Kaisha, Tokyo, Japan

[21] Appl. No.: 09/031,872

[22] Filed: Feb. 27, 1998

[30] Foreign Application Priority Data

Feb. 28, 1997 [JP] Japan .................................. 9-046542

[51] Int. Cl.⁷ ...................................................... F04B 1/12
[52] U.S. Cl. .............................................. 417/269; 91/499
[58] Field of Search ...................................... 417/408, 271, 417/269; 92/71; 60/489; 91/480, 499

[56] References Cited

U.S. PATENT DOCUMENTS

| | | | |
|---|---|---|---|
| 3,943,780 | 3/1976 | Klaue | 475/317 |
| 4,916,901 | 4/1990 | Hayashi et al. | 60/489 |
| 4,951,469 | 8/1990 | Hayashi et al. | 91/480 |

FOREIGN PATENT DOCUMENTS 8-74962 3/1996 Japan .
10-252618 9/1998 Japan .

*Primary Examiner*—Timothy S. Thorpe
*Assistant Examiner*—Michael K. Gray
*Attorney, Agent, or Firm*—Armstrong, Westerman, Hattori, McLeland & Naughton

[57] ABSTRACT

An axial piston pump provided with a pump shaft, a pump cylinder, pistons and a swashplate is stored in the inside of first and second case halves and connected to a valve plate by bolts. A tensile force is made to act on the bolts by transmitting a hydraulic pressure reaction received by the cylinder to the second case half through the valve plate and by transmitting a hydraulic pressure reaction received by the pistons to the first case half through the pump swashplate 32. The tensile force is canceled by generating a thrust force in the pump shaft 10 by meshing a helical gear 50 provided on the pump shaft 10 with a helical gear 49 supported on the valve plate 27, and transmitting this thrust force from the ball bearing 46 to the first case half 42. Thus, it is possible to reduce a tensile force which acts on the casing of an axial piston machine.

1 Claim, 10 Drawing Sheets

AXIAL PISTON MACHINE

BACKGROUND OF THE INVENTION

1. Field of the Invention

The present invention relates to an axial piston pump or motor in which pistons are respectively supported in a plurality of cylinder bores formed in a cylinder in a manner so as to surround the axis thereof, where the pistons are reciprocatingly moved in the direction of the axis by a swashplate.

2. Description of Related Art

A hydrostatic continuously variable transmission which includes in combination an axial piston pump and axial piston motor is known from Japanese patent application Laid-Open No. 8-74962.

However, in the above conventional axial piston pump and axial piston motor, if the cylinder and the pistons are biased in opposite directions away from each other by a hydraulic pressure reaction, a tensile force acts on a casing as a result of a load transmitted from the cylinder to the casing and a load transmitted from the pistons to the casing. Therefore, if the casing is composed of a plurality of separate members integrally connected by bolts, it is necessary to increase the number or diameters of bolts in order to support the tensile force.

SUMMARY OF THE INVENTION

The present invention has been accomplished with the above-described problem in view, and an object of the present invention is to reduce a tensile force acting on the casing of an axial piston machine.

To achieve the above object, according to the present invention, there is provided an axial piston machine comprising a rotational shaft rotatably supported in a casing, a cylinder supported by the rotational shaft and having a plurality of cylinder bores formed to surround the rotational shaft, the plurality of cylinder bores being opened at one of opposite axial ends of the cylinder, a valve plate supported in the casing, the other axial end of the cylinder being in movable contact with the valve plate, a plurality of pistons movably supported in the cylinder bores at their respective portions on the side of other axial end of the cylinder, and a swashplate supported in the casing in such a manner so as to be tilted with respect to the rotational shaft, a portion of each of the pistons on the side of the one axial end of the cylinder being in movable contact with the swashplate, wherein an axial tensile force is caused to act on the casing by transmitting a hydraulic pressure reaction which is received from the cylinder by the pistons to one of opposite axial ends of the casing from the pistons through the swashplate, and by transmitting a hydraulic pressure reaction which is received from the pistons by the cylinder to the other axial end of the casing from the cylinder through the valve plate, and wherein the axial tensile force acting on the casing is canceled by meshing a first helical gear provided on the rotational shaft with a second helical gear rotatably supported in the casing and transmitting a thrust force received from the second helical gear by the first helical gear to the casing through the rotational shaft.

According to the above-described construction, during operation of the axial piston machine, the cylinder and the pistons are biased in opposite directions away from each other by the hydraulic pressure reaction, and the hydraulic pressure reaction received from the cylinder by the pistons is transmitted from the pistons to one axial end of the casing through the swashplate, while the hydraulic pressure reaction received from the pistons by the cylinder is transmitted from the cylinder to the other axial end of the casing through the valve plate, so that an axial tensile force acts on the casing. However, also during operation of the axial piston machine, the first helical gear provided on the rotational shaft and the second helical gear rotatably supported in the casing are made to mesh with each other to transmit a thrust force received from the second helical gear by the first helical gear to the casing through the rotational shaft, whereby a compression is made to act on the casing to cancel the above tensile force. With this construction, it becomes unnecessary to increase the strength of the casing itself or the strength of a connecting member for integrally connecting a plurality of separate members of the casing, thus contributing to a reduction in weight.

The first helical gear corresponds to the second sun gear 16 and the smaller diameter helical gear 50 in an embodiment, while the second helical gear corresponds to the second pinion gear 14 and the larger diameter helical gear 49 in the embodiment.

The above and other objects, features and advantages of the present invention will become apparent from the following detailed description of a preferred embodiment taken in conjunction with the accompanying drawings.

BRIEF DESCRIPTION OF THE DRAWINGS

FIGS. 1 to 10 illustrate a first embodiment of the present invention, wherein FIG. 1 is a side view showing the entire hydraulic and mechanical transmission apparatus for a vehicle;

FIG. 2 is an enlarged vertical sectional view of a part TA of FIG. 1;

FIG. 3 is an enlarged vertical sectional view of a part TB of FIG. 1;

FIG. 4 is a schematic view of a transmission system of the apparatus;

FIG. 5 is an enlarged view of a part 5 of FIG. 2;

FIG. 6 is an essential enlarged view of an essential portion of FIG. 3;

FIG. 7 is a sectional view taken along a line 7—7 in FIG. 6;

FIG. 8 is a sectional view taken along a line 8—8 in FIG. 6;

FIG. 9 is an enlarged view of an essential portion of FIG. 3; and

FIG. 10 is a diagram showing the relationship between swashplate angle and total speed ratio in the transmission apparatus.

DESCRIPTION OF THE PREFERRED EXEMPLARY EMBODIMENT

A preferred exemplary embodiment of the present invention will be described below with reference to FIGS. 1 to 10.

Figure 1:
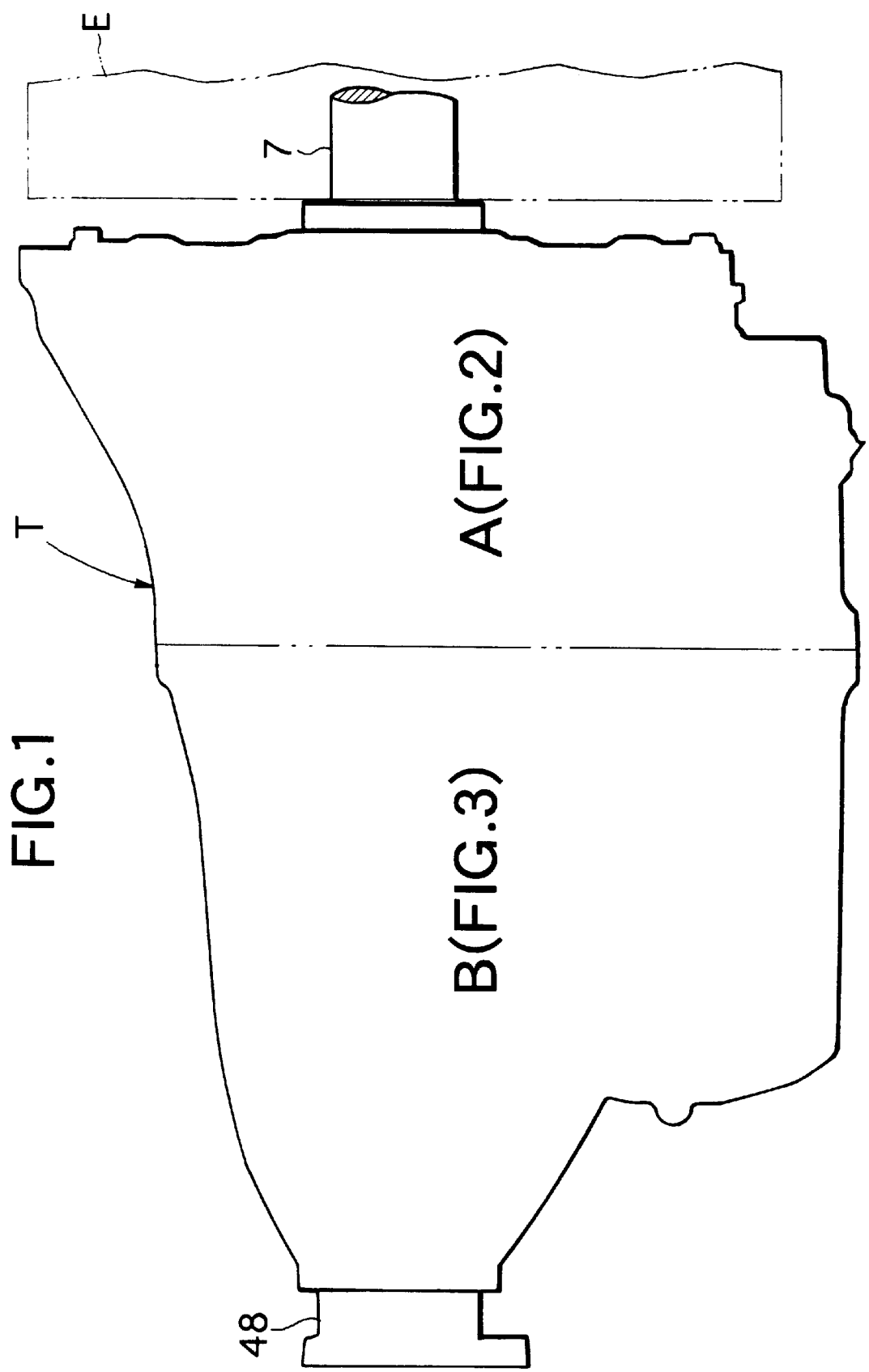
Figure 2:
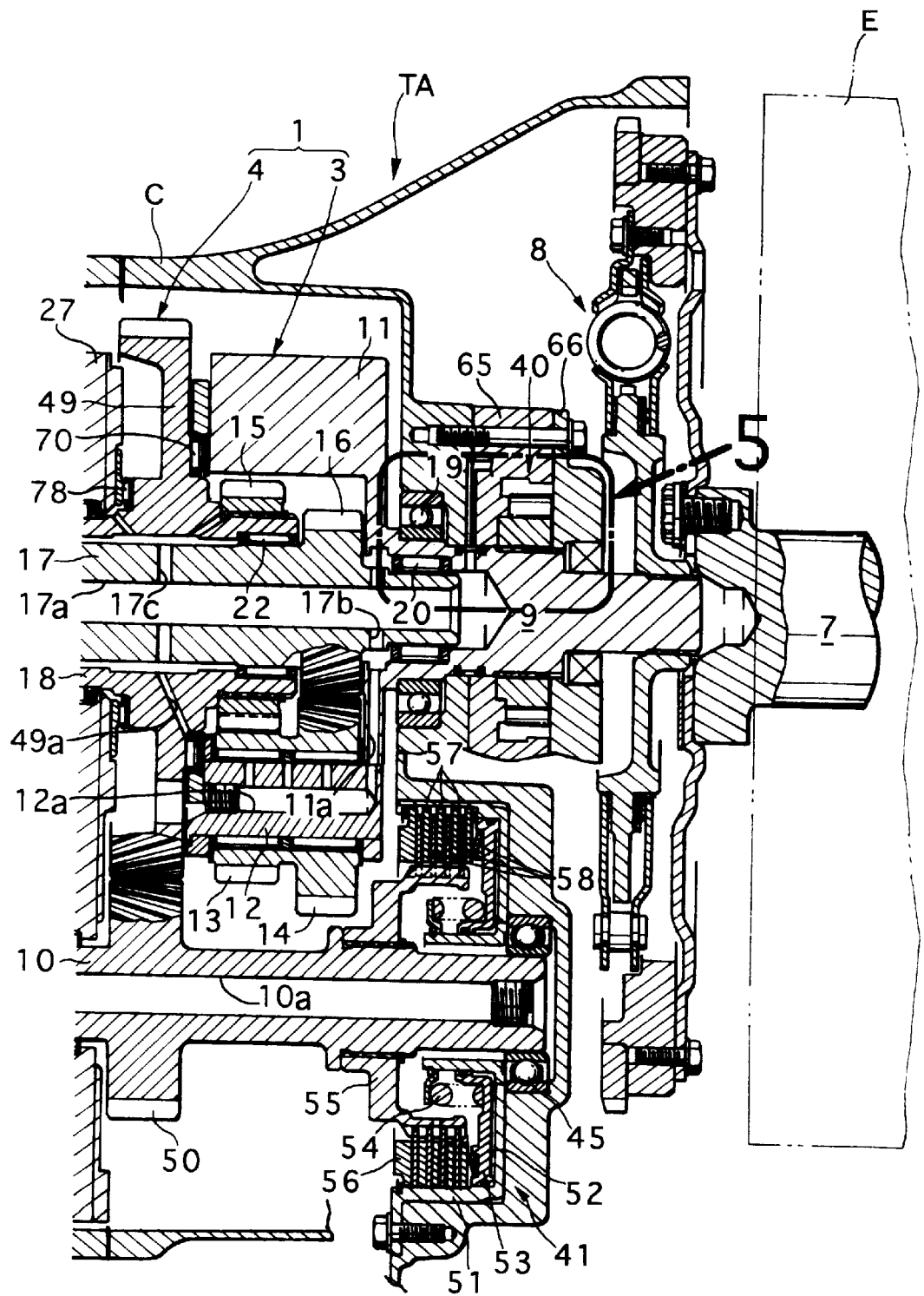
Figure 3:
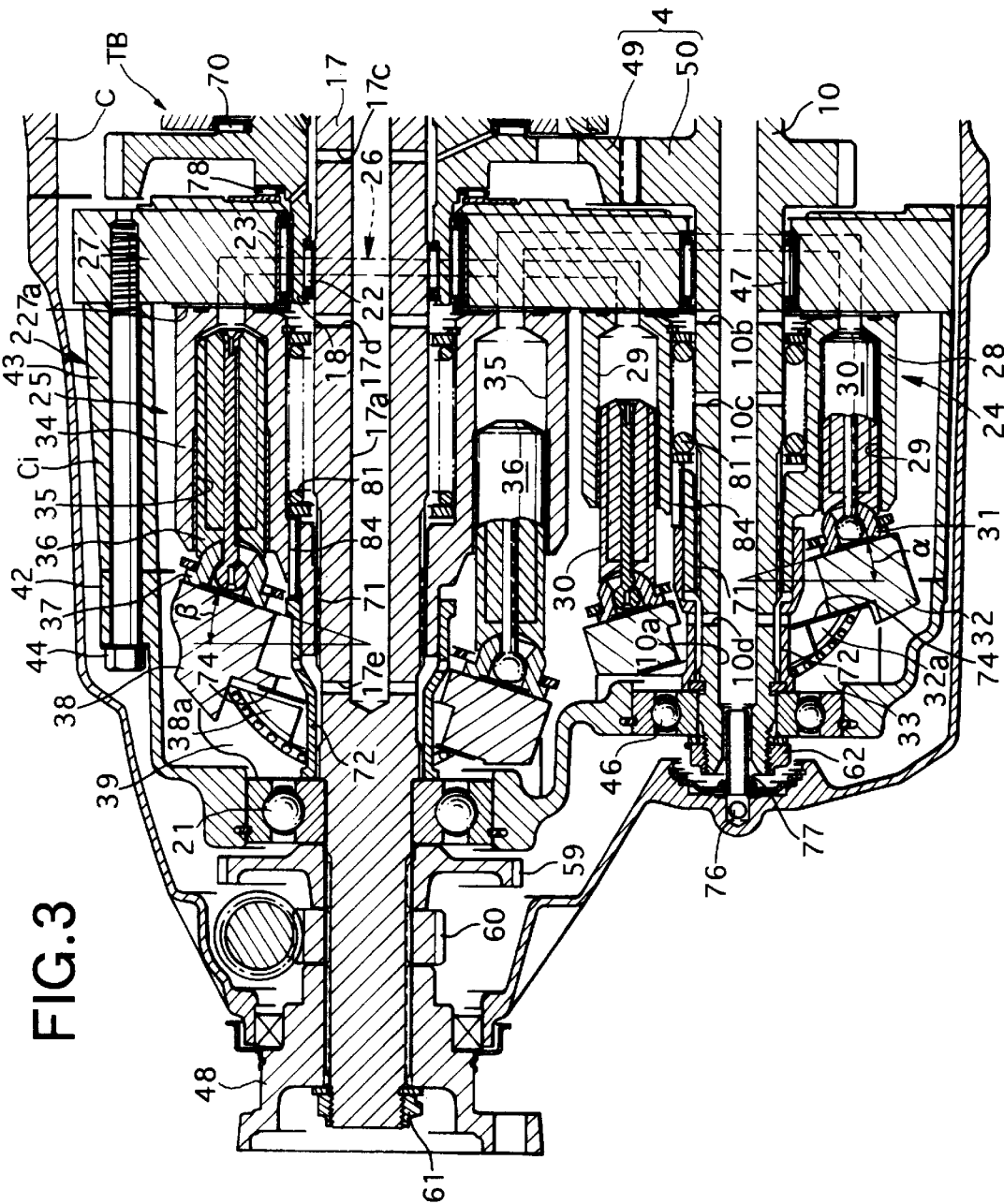
Figure 4:
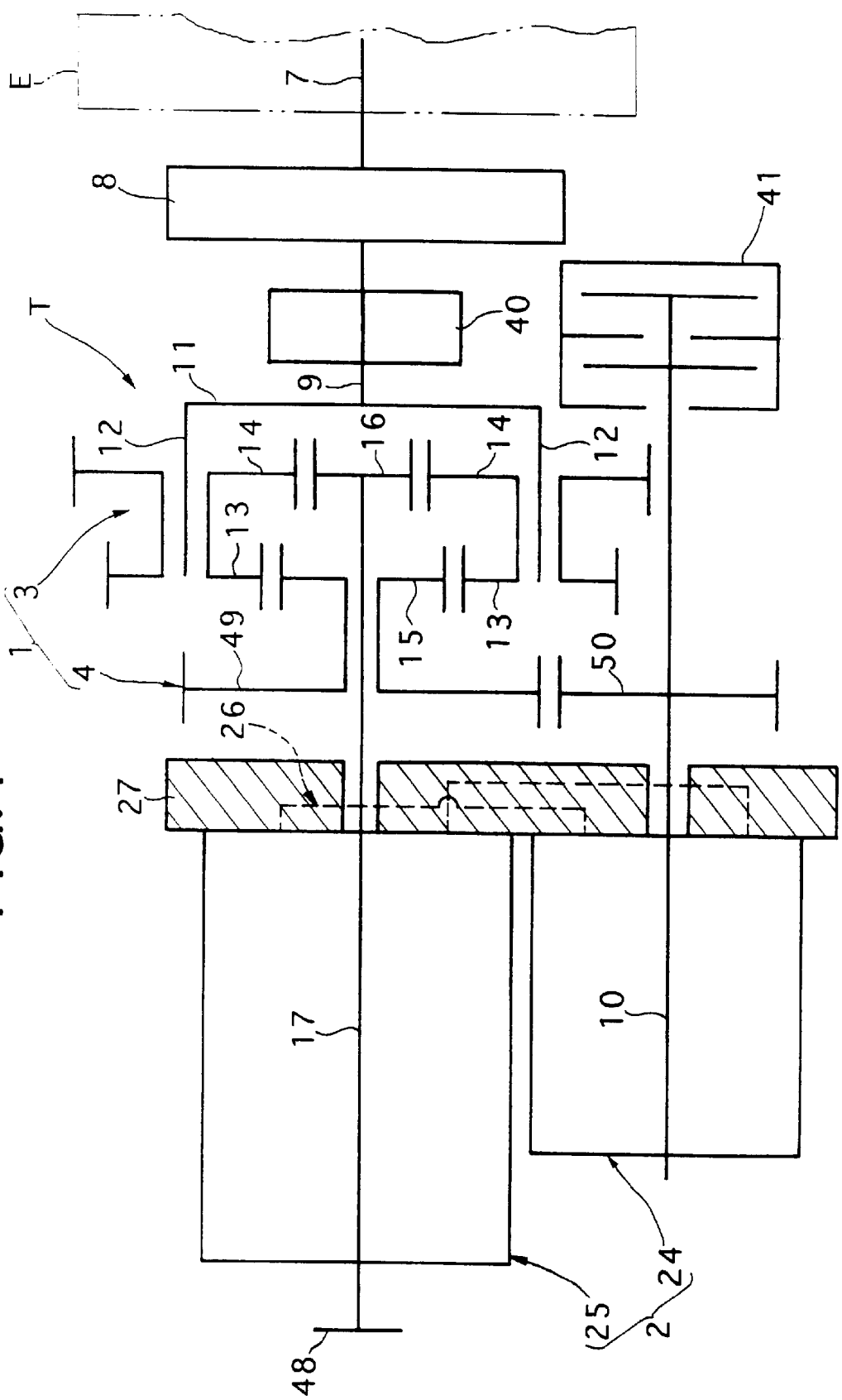

As shown in FIGS. 2 to 4, a hydraulic and mechanical transmission apparatus (TA and TB) for a vehicle includes a mechanical transmission unit 1 and a hydrostatic continuously variable transmission 2, and an engine E which serves as a prime mover is disposed on the front side of the mechanical transmission unit 1 and the hydrostatic continuously variable transmission 2 is disposed on the rear side of the same in such a manner that the mechanical transmission unit 1 is sandwiched between the engine E and the hydrostatic continuously variable transmission 2. These mechanical transmission unit 1 and hydrostatic continuously variable transmission 2 are contained in a mission case C. Furthermore, a hydraulic pump 24 and a hydraulic motor 25 of the hydrostatic continuously variable transmission 2 which are respectively formed of an axial piston pump and an axial piston motor are contained in an inner case Ci disposed in the mission case C, and a valve plate 27 of the hydrostatic continuously variable transmission 2 is connected to an open end face of the inner case Ci adjacent to the mechanical transmission unit 1, in a manner such as to close the open end face. The inner case Ci is divided into a first case half 42 and a second case half 43, and the first and second case halves 42 and 43 are connected to the valve plate 27 by a plurality of bolts 44 (only one of which is shown in FIG. 3).

The hydraulic and mechanical transmission unit 1 is provided with an input shaft 9 connected to a crankshaft 7 of the engine E through a torque damper 8, a power collecting shaft 17 disposed coaxially with the input shaft 9, an intermediate shaft 18 concentrically disposed to surround the power collecting shaft 17, and a pump shaft 10 disposed in parallel to the power collecting shaft 17, and the input shaft 9 is supported on a front end wall of the mission case C via a ball bearing 19. The power collecting shaft 17 which also serves as a motor shaft is supported at its front end on the input shaft 9 via a needle bearing 20 and at its rear end on a rear end wall of the inner case Ci via a ball bearing 21. The intermediate shaft 18 is supported at its front and rear end portions on the outer periphery of the power collecting shaft 17 by needle bearings 22 and 22, and is also supported at its rear end on the valve plate 27 via a needle bearing 23. Therefore, a middle portion of the power collecting shaft 17 is supported on the valve plate 27 via the intermediate shaft 18. A pump shaft 10 is supported at its front end on the front end wall of the mission case C via a ball bearing 45, at its rear end on the rear end wall of the inner case Ci via a ball bearing 46, and at its middle portion on the valve plate 27 via a needle bearing 47.

A parking gear 59, a speed sensor gear 60 and a coupling member 48 are spline-connected to a rear end of the power collecting shaft 17 which projects rearward from the ball bearing 21 supported in the inner case Ci, and are fixed by a nut 61 which is screwed on the power collecting shaft 17. A propeller shaft (not shown) coupled to driven wheels of the vehicle is connected to the coupling member 48 which projects outward from a rear end wall of the mission case C. A rear end of the pump shaft 10 which projects from the ball bearing 46 is fixed to an inner race of the ball bearing 46 by a nut 62.

The mechanical transmission unit 1 includes a power dividing device 3 for distributing power supplied from the engine E between the power collecting shaft 17 and the intermediate shaft 18, and an interlocking device 4 for transmitting power distributed to the intermediate shaft 18 to the pump shaft 10.

The power dividing device 3 is constructed as a planetary gear type, and is provided with a carrier 11 fixed to the input shaft 9, a pair of first and second pinion gears 13 and 14 integrally connected to each other and rotatably supported by a pinion shaft 12 provided on the carrier 11 in parallel with the input shaft 9, and a pair of first and second sun gears 15 and 16 meshed with the respective first and second pinion gears 13 and 14 and arranged on a line coaxial with the input shaft 9. The larger diameter first sun gear 15 is spline-connected to the intermediate shaft 18, and the smaller diameter second sun gear 16 is formed integrally with the power collecting shaft 17. The second sun gear 16 is disposed in such a manner as to be sandwiched between the input shaft 9 and the first sun gear 15. The second pinion gear 14 and the second sun gear 16 which are meshed with each other are constituted of helical gears, respectively.

The interlocking device 4 includes a larger diameter helical gear 49 formed integrally with a middle portion of the intermediate shaft 18 and a smaller diameter helical gear 50 formed integrally with the pump shaft 10 and meshed with the larger diameter helical gear 49, and is disposed in a manner so as to be sandwiched between the power dividing device 3 and the valve plate 27.

The hydrostatic continuously variable transmission 2 includes the hydraulic pump 24, the hydraulic motor 25 and the valve plate having a hydraulic pressure closed circuit 26 which places this pump 24 and motor 25 in communication with each other.

The hydraulic pump 24 is constructed as a variable displacement type, and is provided with a pump cylinder 28 spline-connected to the pump shaft 10 and disposed in movable contact with a hydraulic pressure distributing surface 27a of the valve plate 27, a multiplicity of pump pistons 30 movably supported in a multiplicity of annularly arranged cylinder bores 29 which are defined in the pump cylinder 28 to surround the axis thereof, and a variable-angle pump swashplate 32 with which shoes 31 are in movable contact, the shoes 31 being pivotally provided at tip ends of the respective pump pistons 30. Specifically, the pump swashplate 32 has a semi-cylindrical trunnion shaft 32a which is rotatably supported by a pump swashplate anchor 33 fixed to the inner case Ci. Thus, the pump swashplate 32 is capable of increasing or decreasing the reciprocation stroke of each of the pump pistons 30 according to an increase or decrease in a tilt angled from a standing position perpendicular to an axis of the trunnion shaft 32a.

The hydraulic motor 25 is also constructed as a variable displacement type, and is provided with a motor cylinder 34 spline-connected to the power collecting shaft 17 and disposed in movable contact with the hydraulic pressure distributing surface 27a of the valve plate 27, a multiplicity of motor pistons 36 movably supported in a multiplicity of annularly arranged cylinder bores 35 which are defined in the motor cylinder 34 to surround the axis thereof, and a variable-angle motor swashplate 38 with which shoes 37 are disposed in movable contact, the shoes 37 being pivotally provided at tip ends of the respective motor pistons 36. Specifically, the motor swashplate 38 has a semi-cylindrical trunnion shaft 38a which is rotatably supported by a motor swashplate anchor 39 fixed to the inner case Ci. Thus, the motor swashplate 38 is capable of increasing or decreasing the reciprocation stroke of each of the motor pistons 36 according to an increase or decrease in a tilt angle $\beta$ from a standing position perpendicular to an axis of the trunnion shaft 38a.

A supply pump 40 which makes up for an oil leakage from the hydraulic pressure closed circuit 26 and which supplies an oil for lubricating and cooling each part is mounted on the outer surface of a front end wall of the mission case C so as to be driven by the input shaft 9.

A lock-up device 41 capable of fixing the pump shaft 10 at an appropriate time by using a discharge hydraulic pressure of the supply pump 40 is constructed between the front end wall of the mission case C and the pump shaft 10, and is arranged in such a manner that the power dividing device 3 and the interlocking device 4 are partly sandwiched between the lock-up device 41 and the valve plate 27, and in such a manner as to be adjacent to the supply pump 40 in a radial direction.

The lock-up device 41 includes a cylinder 51 having a bottomed cylindrical shape which is fixed to the front end wall of the mission case C from inside to surround one end portion of the pump shaft 10, a piston 53 supported in the cylinder 51 to define a hydraulic pressure chamber 52 between the piston 53 and an end wall of the cylinder 51, a return spring 54 which biases the piston 53 toward the hydraulic pressure chamber 52, a cylindrical lock-up center 55 spline-connected to the pump shaft 10 in the cylinder 51, a pressure receiving plate 56 supported at an open end of the cylinder 51, a plurality of outside friction plates 57 movably spline-connected to the inner periphery of the cylinder 51 between the piston 53 and the pressure receiving plate 56, and a plurality of inside friction plates 58 movably spline-connected to the outer periphery of the lock-up center 55 between the piston 53 and the pressure receiving plate 56 in a manner such that the inside friction plates 58 and the outside friction plates 57 are alternately stacked. Thus, if a discharge hydraulic pressure of the supply pump 40 is supplied to the hydraulic pressure chamber 52 through a control valve (not shown), the piston 53 moves toward the pressure receiving plate 56 to clamp the inside and outside friction plates 58 and 57 so that the pump shaft 10 can be braked via the lock-up center 55 by the frictional contact between the inside and outside friction plates 58 and 57. A reaction to this braking is received by the front end wall of the mission case C through the cylinder 51.

A lubricating system of the hydraulic and mechanical transmission apparatus T will now be described.

Figure 5:
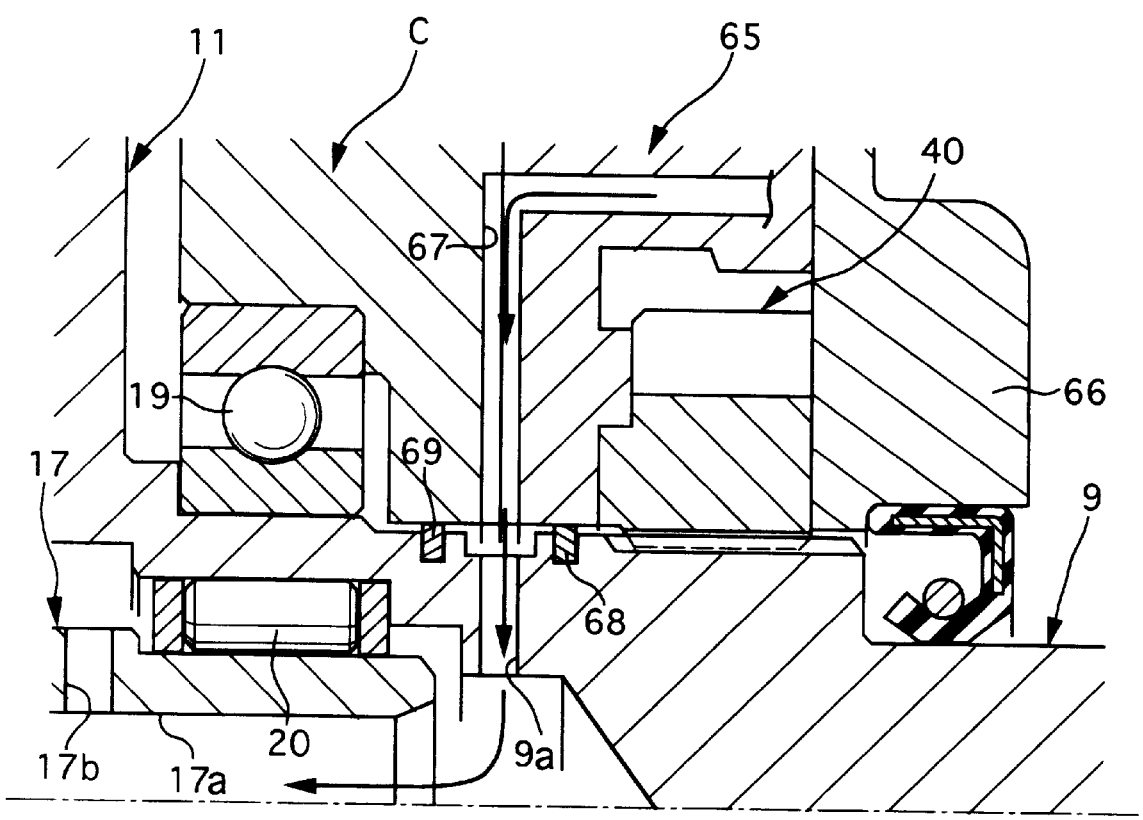

As is apparent from FIGS. 2 and 5, the supply pump 40 which is formed by an external gear pump having a pair of external gears meshed with each other (only one of the external gears is shown) is stored in a pump body 65 connected to a front surface of the mission case C, and the front surface is covered with a pump cover 66. An oil passage 67 which extends to a discharge port (not shown) of the supply pump 40 is formed in the surface of connection between the mission case C and the pump body 65, and the oil passage 67 communicates with a front end of the power collecting shaft 17 through an oil hole 9a which extends through the input shaft 9 in a radial direction. A seal member 68 is disposed between the pump body 65 and the input shaft 9 and another seal member 69 is disposed between the mission case C and the input shaft 9 so that oil does not leak through the gap between the input shaft 9 and the pump body 65 or the mission case C.

As is apparent from FIGS. 2 and 3, a closed oil passage 17a which is opened at the front end of the power collecting shaft 17 is formed in the inside of the power collecting shaft 17, and therefore, oil discharged from the supply pump 40 is supplied to the oil passage 17a of the power collecting shaft 17 through the oil passage 67 and the oil hole 9a of the input shaft 9. Oil holes 17b to 17e which extend through the power collecting shaft 17 in a radial direction thereof are formed at four axial positions along the oil passage 17a of the power collecting shaft 17. Oil which has passed through the front oil hole 17b lubricates and cools the needle bearing 20 on the front side, and passes through an oil passage 11a formed in the carrier 11 in a radial direction thereof and an oil passage 12a formed in the pinion shaft 12 and lubricates and cools the first and second pinion gears 13 and 14.

Oil which has passed through the second oil hole 17c from the front passes through an oil hole 49a which extends through the larger diameter helical gear 49, and lubricates and cools a thrust bearing 70 disposed between the larger diameter helical gear 49 and the carrier 11, and further lubricates and cools a thrust bearing 78 disposed between the larger diameter helical gear 49 and the valve plate 27, and a spline portion of the first sun gear 15, and the corresponding needle bearing 22. Oil which has passed through the third oil passage 17d from the front lubricates and cools the portion of contact between the motor cylinder 34 and the hydraulic pressure distributing surface 27a of the valve plate 27, and also lubricates and cools the needle bearings 22 and the needle bearing 23.

Figure 6:
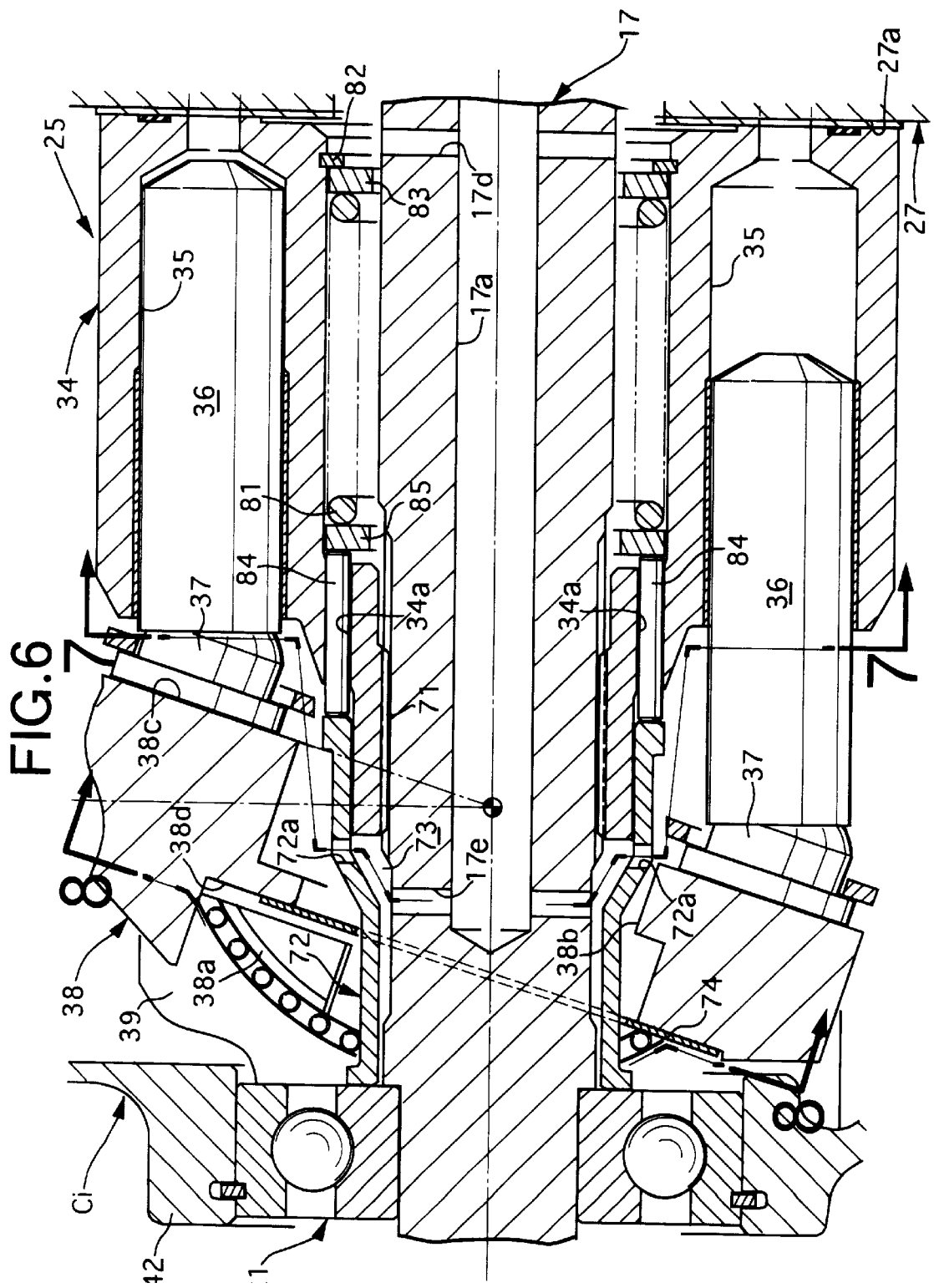

As is apparent from FIG. 6, the motor cylinder 34 is axially movably supported on the power collecting shaft 17 by a spline 71 formed on an end portion of the power collecting shaft 17 adjacent to the motor swashplate 38. A collar member 72 of approximately cylindrical shape is supported at its rear end on the outer periphery of the power collecting shaft 17, and the inner periphery of the front end of the collar member 72 is fitted on the outer periphery of the rear end of the spline 71 of the motor cylinder 34. Therefore, an annular oil distribution chamber 73 is defined between the power collecting shaft 17 and the collar member 72, and two oil holes 17e formed at a rearmost portion of the power collecting shaft 17 are opened to the oil distribution chamber 73 and nine oil holes 72a which are formed in the collar member 72 at equal intervals in the circumferential direction thereof are opposed to a through-hole 38b in the motor swashplate 38.

Thus, oil which has been supplied to the oil distribution chamber 73 through the oil holes 17e of the power collecting shaft 17 are uniformly scattered radially outward from the nine oil holes 72a of the collar member 72 to effectively lubricate and cool a contact surface 38c of the motor swashplate 38. The axial positions of the nine oil holes 72a are determined so that the oil is reliably supplied to the contact surface 38c at that time even if the tilt angle of the motor swashplate 38 varies. Incidentally, if such plurality of oil holes 72a are respectively formed at a plurality of axial positions of the collar member 72, uniform supply of the oil is enabled irrespective of the tilt angle of the motor swashplate 38.

In the above embodiment, the two oil holes 17e of the power collecting shaft 17 are formed, but if the number of the oil holes 17e is increased and the collar member 72 is removed, it is possible to uniformly lubricate and cool the contact surface 38c of the motor swashplate 38. However, if a multiplicity of oil holes 17e are formed in the power collecting shaft 17, the strength of the power collecting shaft 17 is reduced. In contrast, according to the above embodiment, it is possible to enhance the effect of lubricating the contact surface 38c by means of the multiplicity of oil holes 72a of the collar member 72, while ensuring the strength of the power collecting shaft 17 by forming a minimum required number of oil holes 17e.

In this manner, according to the present embodiment, since it is possible to effect lubrication and cooling without immersing the pump swashplate 32 and the motor swashplate 38 in the oil, it is possible to decrease the stirring resistance of the oil and minimize energy loss.

If oil which has been supplied to the contact surface 38c of the motor swashplate 38 from the oil holes 72a of the collar member 72 flows out to the opposite side to the contact surface 38c through the through-hole 38b of the motor swashplate 38, the oil becomes unable to contribute to the lubrication and cooling of the contact surface 38c. For this reason, a closing member 74 which closes the through-hole 38b is provided for preventing such oil from flowing out through the through-hole 38b of the motor swashplate 38.

Figure 8:
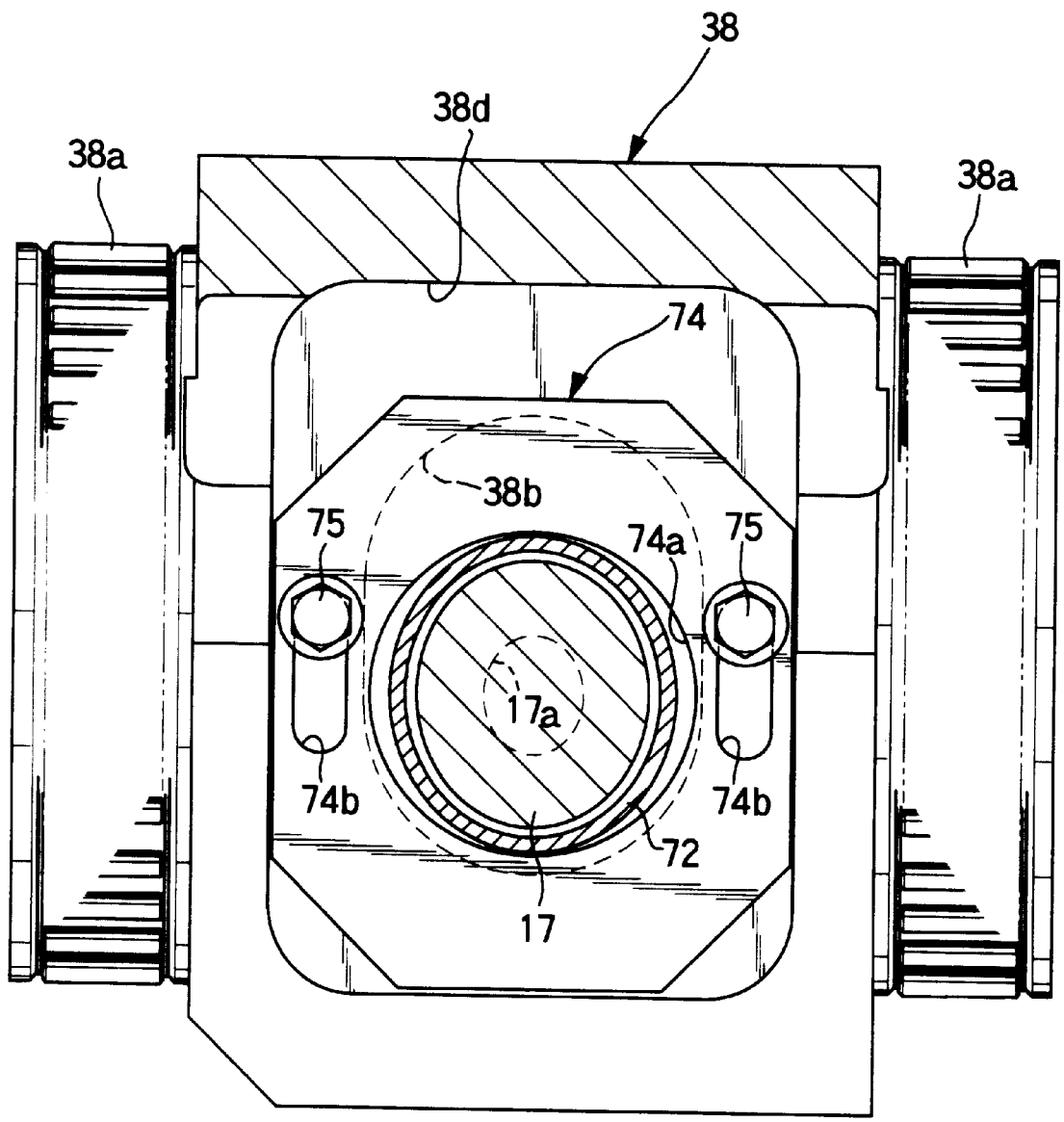

As is apparent from FIGS. 6 and 8, the motor swashplate 38 is formed into an approximately rectangular shape, and the contact surface 38c is formed on one side of the motor swashplate 38 and a guide recess 38d having an approximately rectangular shape which is vertically elongated is formed in the other side of the motor swashplate 38. The through-hole 38b of the motor swashplate 38 is formed into a vertically elongated elliptic shape so that the through-hole 38b is prevented from interfering with the power collecting shaft 17 during tilting of the motor swashplate 38. The closing member 74 which is movably supported in the guide recess 38d is made from an octagonal plate, and a circular opening 74a through which the power collecting shaft 17 is inserted is formed in a central portion of the closing member 74, and a pair of slots 74b which are vertically elongated are formed on the left and right sides of the opening 74a. The closing member 74 is allowed to move upward and downward while being prevented from coming off the guide recess 38d by two bolts 75 which are respectively screwed into the motor swashplate 38 through the pair of elongated holes 74b.

The diameter of the opening 74a of the closing member 74 is formed to be slightly larger than the diameter of the power collecting shaft 17 so that a tilting of the closing member 74 with respect to the power collecting shaft 17 is enabled when the closing member 74 is tilted together with the motor swashplate 38. Because the closing member 74 is biased downward by gravity, the closing member 74 is supported with the upper end of the opening 74a kept in contact with the upper end of the power collecting shaft 17. In addition, the closing member 74 is eccentric with respect to the center of the trunnion shaft 38a of the motor swashplate 38, and therefore, if the closing member 74 is fixed to the motor swashplate 38, the opening 74a interferes with the power collecting shaft 17 and disables the motor swashplate 38 from being tilted. However, the above problem is solved by moving the closing member 74 upward and downward according to the tilting of the motor swashplate 38.

By closing the gap between the power collecting shaft 17 and the through-hole 38b of the motor swashplate 38 with the closing member 74 in the above-described manner, it is possible to effectively supply to the contact surface 38c the oil which has been supplied to the motor swashplate 38 from the collar member 72, without allowing such oil to flow out through the through-hole 38b. Furthermore, because the closing member 74 can move upward and downward with respect to the motor swashplate 38, the closing member 74 is prevented from interfering with the power collecting shaft 17 during the tilting of the motor swashplate 38.

Figure 9:
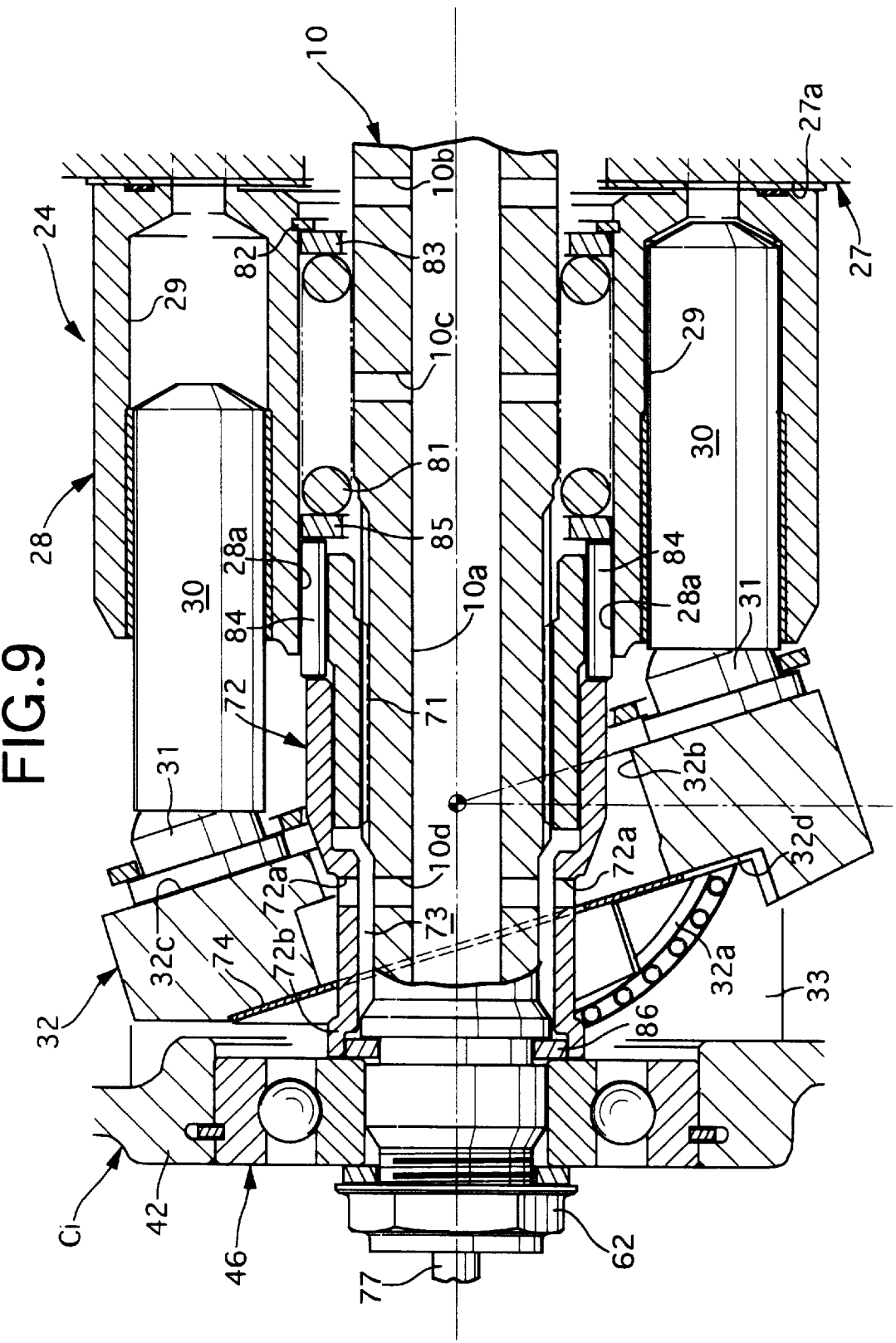

A discharge port of the supply pump 40 (see FIG. 2) is connected to a rear end portion of an oil passage 10a formed in the inside of the pump shaft 10, through an oil passage 76 and an oil pipe 77 (see FIG. 3) formed in the mission case C. As shown in FIG. 9, oil holes 10b, 10c and 10d, each of which extends in a radial direction, branch from three axial positions of the oil passage 10a of the pump shaft 10, respectively. Oil which has been supplied from the oil holes 10b and 10c lubricates and cools the needle bearing 47 and the portion of contact between the pump cylinder 28 and the hydraulic pressure distributing surface 27a of the valve plate 27.

Oil which has been supplied from the two oil holes 10d formed at the rearmost portion of the pump shaft 10 lubricates and cools a contact surface 32c of the pump swashplate 32, and the collar member 72 and the closing member 74 are provided so that such oil is uniformly supplied to the contact surface 32c. The structure and function of each of the collar member 72 and the closing member 74 of the pump shaft 10 are identical to those of the above-described power collecting shaft 17, and the same description is omitted.

A structure for resiliently forcing the motor cylinder 34 of the hydraulic motor 25 against the hydraulic pressure distributing surface 27a of the valve plate 27 will now be described.

Figure 7:
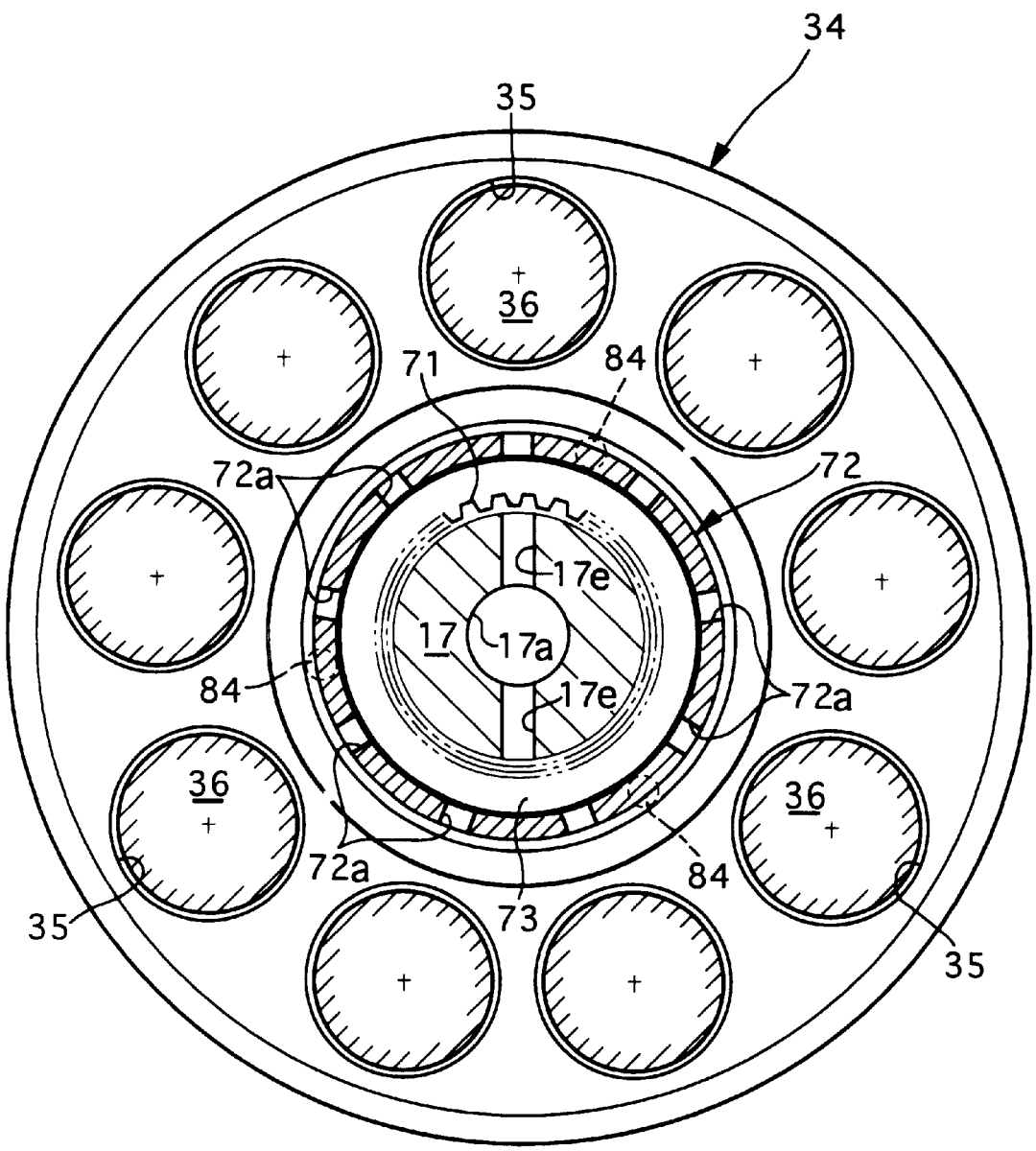

As is apparent from FIGS. 6 and 7, a spring 81 housed in compression in the space between the inner periphery of the motor cylinder 34 and the outer periphery of the power collecting shaft 17 is supported at its front end by a washer 83 fixed to the inner periphery of the motor cylinder 34 by a clip 82. Three guide holes 34a which extend through the motor cylinder 34 in an axial direction thereof are formed at intervals of 120°, radially outside the spline 71 which spline-connects the motor cylinder 34 to the power collecting shaft 17. Pins 84 which are movably supported in the respective guide holes 34a are supported at their front ends by the rear end of the spring 81 via a washer 85 which is movable in an axial direction, and the rear ends of the respective pins 84 are supported by the front end of the collar member 72. Thus, the resilient force of the rear end of the spring 81 is transmitted to the inner case Ci through the washer 85, the three pins 84, the collar member 72 and the ball bearing 21, and the resilient force of the front end of the spring 81 is transmitted to the motor cylinder 34 through the washer 83 and the clip 82, whereby the front end of the motor cylinder 34 is resiliently forced against the hydraulic pressure distributing surface 27a of the valve plate 27.

The motor cylinder 34 and the spring 81 are fitted from the rear of the power collecting shaft 17 from the side of the motor swashplate 38. Specifically, the washer 85, the spring 81, the washer 83 and the clip 82 are fitted into the inner periphery of the motor cylinder 34 in advance, and the motor cylinder 34 is inserted from the rear-end side of the power collecting shaft 17 and connected by the spline 71. Then, after the pins 84 have been inserted into the respective guide holes 34a of the motor cylinder 34, the collar member 72, the motor swashplate 38 and the motor swashplate anchor 39 are fitted onto the power collecting shaft 17, and furthermore, the ball bearing 21 is fixed to the inner case Ci in such a way that the rear end of the collar member 72 is pressed toward the front. Then, the parking gear 59, the speed sensor gear 60 and the coupling member 48 are fitted onto the power collecting shaft 17 and fixed thereto with the nut 61.

As described above, the pins 84 are axially movably disposed radially outside the spline 71, and the resilient force of the rear end of the spring 81 is transmitted to a rear end portion of the inner case Ci through the pins 84, whereby the motor cylinder 34 can be biased toward the valve plate 27. Therefore, because it is unnecessary to form a step on the power collecting shaft 17 so as to support the rear end of the spring 81, it is possible to fit the motor cylinder 34 and the spring 81 from the side of the motor swashplate 38, thereby improving ease of assembly.

Similarly, in the hydraulic pump 24 as well, the front and rear ends of each of the pins 84 which are movably supported in guide holes 28a formed in the pump cylinder 28 are supported by the rear end of the spring 81 and the front end of the collar member 72, respectively and therefore, the pump cylinder 28 and the spring 81 can be fitted from the side of the pump swashplate 32.

As is apparent from FIG. 9, the ball bearing 46 which supports the pump shaft 10 on the inner case Ci is supported by a cotter 86 which is fitted in an annular groove 10e formed around the pump shaft 10. A step 72b is formed at the rear end of the collar member 72 supported on the outer periphery of the pump shaft 10 and the front surface and the outer periphery of the cotter 86 are pressed by the step 72b, and therefore, it is possible to reliably prevent the cotter 86 from coming off without the need for a special part.

The operation of this embodiment will now be described.

If a power of the engine E is supplied to the input shaft 9 from the crank shaft 7 through the torque damper 8, the power passes through the pinion shaft 12 of the carrier 11 and is distributed between the pinion gears 13 and 14 having different diameters. The power distributed to the smaller diameter first pinion gear 13 is transmitted to the pump shaft 10 from the first sun gear 15 of larger diameter through the intermediate shaft 18 and the interlocking device 4. Therefore, if the lock-up device 41 is in an inoperative state, the pump cylinder 28 of the hydraulic pump 24 is rotationally driven by the pump shaft 10. Then, if each of the pump swashplate 32 and the motor swashplate 38 is in the state of being tilted at an appropriate angle from the standing position, each of the pump pistons 30 makes one reciprocating motion in the corresponding cylinder bore 29 for each rotation of the pump cylinder 28 with a stroke corresponding to the tilt angle a of the pump swashplate 32, thereby performing a discharge and suction operation. The pressure oil discharged from each of the cylinder bores 29 passes through a higher pressure side of the hydraulic pressure closing circuit 26 of the valve plate 27, and is transmitted to the corresponding cylinder bore 35 of the motor cylinder 34 and provides, an expansion operation to the corresponding motor piston 36. As the motor piston 36 presses the motor swashplate 38, a rotational component of the resulting reaction causes the motor piston 36 to rotate the motor cylinder 34, and the resultant power is transmitted to the power collecting shaft 17. Then, the motor piston 36, after it has completed its expansion work, is provided a retraction operation by the motor swashplate 38, and the oil discharged from the corresponding cylinder bore 35 passes through a lower pressure side of the hydraulic pressure closed circuit 26 and is sucked into the cylinder bore 29 of the pump piston 30 which performs a suction operation. In this manner, in the hydraulic motor 25, the motor piston 36 is reciprocatingly moved with a stroke corresponding to the tilt angle β of the motor swashplate 38, and the motor cylinder 34 makes one rotation for one reciprocation of the motor piston 36 together with the power collecting shaft 17.

Thus, the respective displacements of the hydraulic pump 24 and the hydraulic motor 25 depend on the strokes of the corresponding pistons 30 and 36, i.e., the angles α and β of the corresponding swashplates 32 and 38, and the speed ratio of the hydrostatic continuously variable transmission 2 can be continuously controlled by changing the angles α and β of the respective swashplates 32 and 38.

On the other hand, the power distributed to the second pinion gear 14 of larger diameter is transmitted directly to the power collecting shaft 17 from the second sun gear 16 of smaller diameter, and the power collecting shaft 17 is driven.

In this manner, the power of the engine E is divided into two portions by the power dividing device 3, and either one of the portions is transmitted to the power collecting shaft 17 after it has been reduced in a continuously variable manner by the hydrostatic continuously variable transmission 2, whereas the other portion is directly transmitted to the power collecting shaft 17. Accordingly, it is possible to achieve power transmission while satisfying both the performance of the continuously variable transmission and efficient power transmission performance. Then, the two portions are combined at the power collecting shaft 17, and the obtained power is transmitted to the propeller shaft which is not shown through the coupling member 48, and driven wheels are driven.

Then, the relationship between the tilt angles α and β of the respective swashplates 32 and 38 and a total speed ratio e in the hydraulic and mechanical transmission apparatus T will be described below with reference to FIG. 10.

Figure 10:
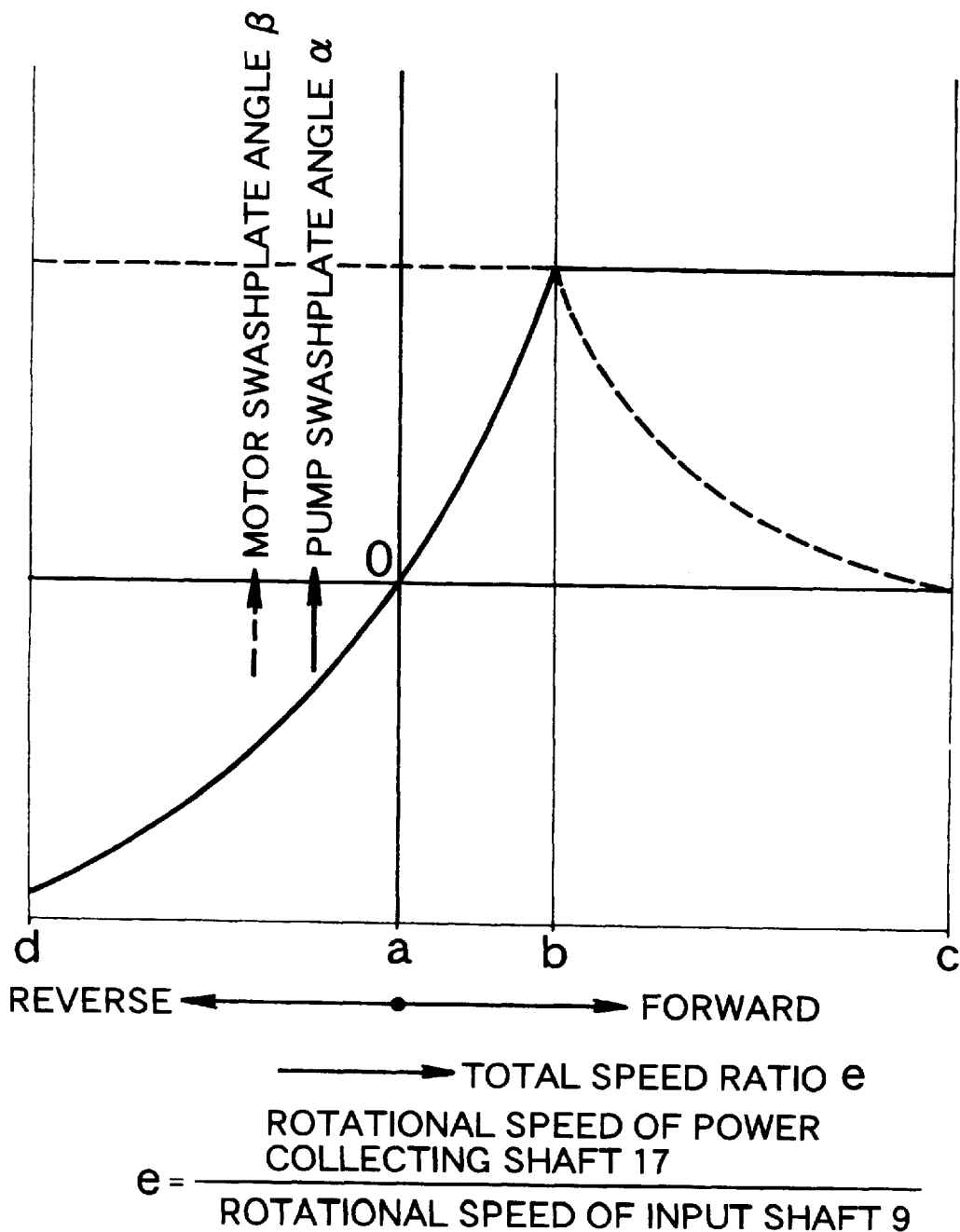

In the graph shown in FIG. 10, the horizontal axis represents the total speed ratio e, where e=rotational speed of power collecting shaft 17/rotational speed of input shaft 9 and the vertical axis represents the tilt angles α and β of the respective pump swashplate 32 and motor swashplate 38.

(1) Total Speed Ratio e=a

At this time, the pump swashplate 32 is controlled to satisfy α=0, and the motor swashplate 38 is controlled to satisfy β=βmax. The displacement of the hydraulic pump 24 is zero because α=0, and therefore, even if the pump cylinder 28 is driven from the pump shaft 10, the pump pistons 30 do not perform a stroke operation and cannot generate a hydraulic pressure in the hydraulic pressure closed circuit 26, and the hydraulic motor 25 does not operate. Accordingly, all the power of the engine E supplied to the input shaft 9 is consumed by the substantially no-load idling of the pump cylinder 28 and the power collecting shaft 17 does not rotate. Consequently, the total speed ratio becomes e=0 (reduction ratio: infinity).

(2) Total Speed Ratio e=a–b

In the area a-b, the angle α of the pump swashplate 32 is gradually increased to αmax with the motor swashplate 38 kept at β=βmax. Specifically, the displacement of the hydraulic pump 24 increases with an increase in the angle α, and the hydraulic motor 25 is activated according to the increase in such capacity and the transmission of power to the power collecting shaft 17 is also initiated. Consequently, the total speed ratio e gradually increases.

(3) Total Speed Ratio e=b–c

In the region b-c, the angle β of the motor swashplate 38 is gradually decreased from βmax to 0 with the motor swashplate 38 kept at β=βmax. Since the displacement of the hydraulic motor 25 decreases with the decrease in the angle β, the rotational speed of the pump cylinder 28 gradually decreases due to an increase in the load on the hydraulic pump 24, and the pump cylinder 28 stops at β=0. In contrast, the rotational speed of the power collecting shaft 17 gradually increases, and therefore, the total speed ratio e reaches a maximum at β=0. In other words, power transmission is substantially effected by only the mechanical transmission unit 1.

At this time, if the lock-up device 41 is operated, the pump shaft 10 can be mechanically fixed and a hydraulic pressure need not be generated in the hydraulic pressure closed circuit 26. Therefore, it is possible to prevent a power loss due to the leakage of a hydraulic pressure from the hydraulic pressure closed circuit 26.

(4) Total Speed Ratio e=a–d

In the area a-d, the pump swashplate 32 is gradually tilted in a negative direction from α=0, i.e., from the standing position toward a direction opposite to that during a forward movement, with the pump swashplate 32 kept at α=αmax. In this area, since the oil pressure discharge direction of the hydraulic pump 24 with respect to the hydraulic pressure closed circuit 26 is reversed, the relationship between the higher pressure side and the lower pressure side in the hydraulic pressure closed circuit 26 is opposite to that during the forward movement and the motor cylinder 34 reverses, and therefore, the power collecting shaft 17 can be reversed.

In such hydraulic and mechanical transmission apparatus T, the motor cylinder 34 and the motor pistons 36 of the hydraulic motor 25 are biased in opposite directions away from each other by a hydraulic pressure reaction, while the pump cylinder 28 and the pump pistons 30 of the hydraulic pump 24 are biased in opposite directions away from each other by a hydraulic pressure reaction. Consequently, the motor cylinder 34 which is biased by the hydraulic pressure reaction toward the right as viewed in FIG. 3 biases toward the right the valve plate 27 with which the motor cylinder 34 is in movable contact, while the motor pistons 36 which are biased toward the left by the hydraulic pressure reaction bias toward the left the first case half 42 of the inner case Ci via the motor swashplate 38 and the motor swashplate anchor 39. The pump cylinder 28 which is biased toward the right by the hydraulic pressure reaction biases toward the right the valve plate 27 with which the pump cylinder 28 is in movable contact, while the pump pistons 30 which are biased toward the left by the hydraulic pressure reaction bias toward the left the first case half 42 of the inner case Ci via the pump swashplate 32 and the pump swashplate anchor 33. Thus, a tensile load acts on the bolts 44 which connect the first case half 42 and the second case half 43 to the valve plate 27.

On the other hand, the power collecting shaft 17 formed integrally with the second sun gear 16 is biased toward the right as viewed in FIGS. 2 and 3, by a thrust force generated by the engagement between the second pinion gear 14 and the second sun gear 16 both of which are helical gears, and this biasing force passes from the power collecting shaft 17 through the nut 61, the speed sensor gear 60, the parking gear 59 and the ball bearing 21 and biases toward the right the first case half 42 of the inner case Ci. In addition, the pump shaft 10 formed integrally with the smaller diameter helical gear 50 is biased toward the right by a thrust force generated by the engagement between the larger diameter helical gear 49 and the smaller diameter helical gear 50, and this biasing force passes from the pump shaft 10 through the nut 62 and the ball bearing 46 and biases the first case half 42 of the inner case Ci toward the right. The rightward thrust force generated by the helical gears acts in a direction in which the inner case Ci is forced against the valve plate 27, and cancels the tensile load acting on the bolts 44. Therefore, it is possible to use smaller diameter bolts as the bolts 44 or alternatively, to reduce the number of the bolts 44.

Incidentally, if the hydraulic and mechanical transmission apparatus T is used as a transmission for a vehicle, the axial load generated by the hydraulic pump 24 and the hydraulic motor 25 is the same in direction, but the axial load generated by the helical gears is reversed in direction, in a case where a drive force is transmitted from an engine side to a wheel side (acceleration) and in a case where a drive force is transmitted from the wheel side to the engine side (deceleration). In this case, the tilt directions of the teeth of the helical gears are set so that the axial load generated by the hydraulic pressure can be canceled by the axial load generated by the helical gears in the case where a drive force is transmitted from the engine side to the wheel side (acceleration). Thus, it is possible to effectively cancel the above load during the acceleration of the vehicle in which the load becomes large because the transmission torque of the hydraulic and mechanical transmission apparatus T is large.

Although the embodiment of the present invention has been described above in detail, various design changes may be made without departing from the scope and spirit of the invention.

For example, it is also possible to construct either one of the hydraulic pump 24 and the hydraulic motor 25 as a fixed displacement type by fixing the corresponding swashplate.

What is claimed is:

1. An axial piston machine comprising:

a rotational shaft rotatably supported in a casing;

a cylinder supported by said rotational shaft and having a plurality of cylinder bores formed to surround said rotational shaft, said plurality of cylinder bores being open at one of opposite axial ends of said cylinder;

a valve plate supported in said casing, the other axial end of said cylinder being in movable contact with said valve plate;

a plurality of pistons movably supported in said cylinder bores at their respective portions on the side of the other axial end of the cylinder; and a swashplate supported in said casing in a manner so as to be tilted with respect to said rotational shaft, a portion of each of said pistons on the side of the one axial end of the cylinder being in movable contact with said swashplate, wherein an axial tensile force is caused to act on said casing by transmitting a hydraulic pressure reaction which is received from said cylinder by said pistons to one of opposite axial ends of said casing from said pistons through said swashplate, and by transmitting a hydraulic pressure reaction which is received from said pistons by said cylinder to the other axial end of said casing from said cylinder through said valve plate, and wherein said axial tensile force acting on said casing is canceled by meshing a first helical gear provided on said rotational shaft with a second helical gear rotatably supported in said casing and transmitting a thrust force received from said second helical gear by said first helical gear to said casing through said rotational shaft.

* * * * *